July 22, 1969 P. J. WAZNYS ETAL 3,457,378
MULTISPEED ENCODER
Filed Aug. 14, 1967
2 Sheets-Sheet 1
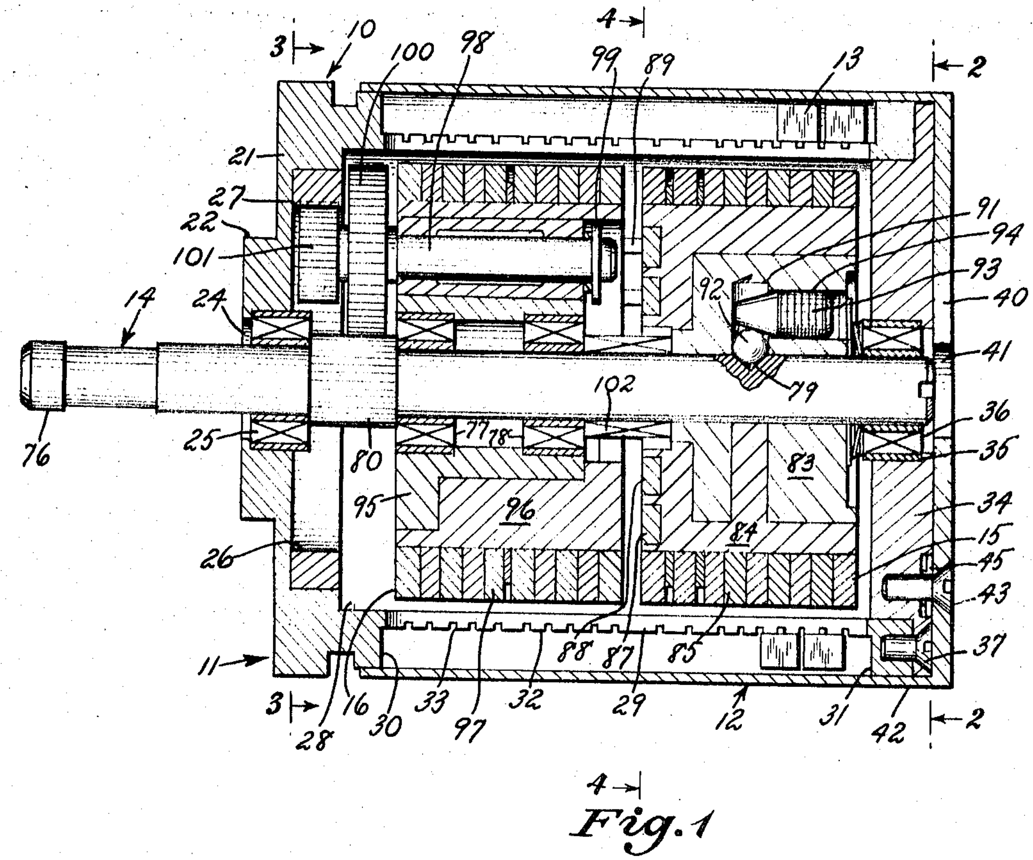
Fig.1
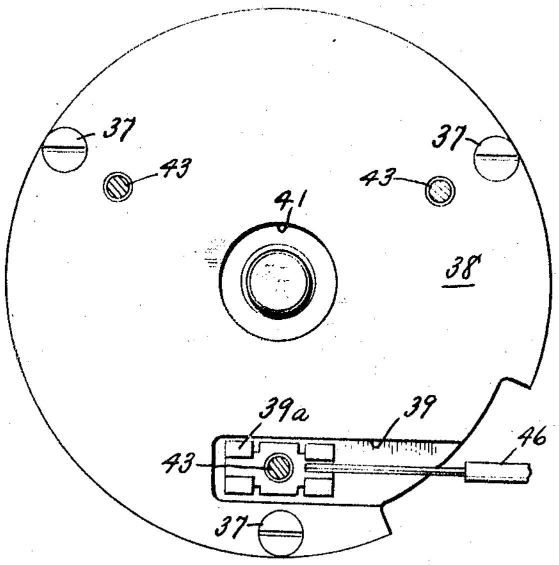
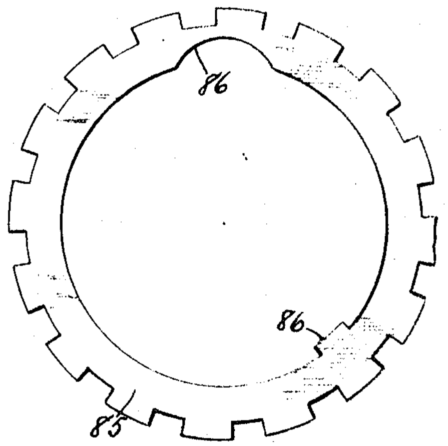
Fig.2 Fig.11

MULTISPEED ENCODER

Filed Aug. 14, 1967

2 Sheets-Sheet 2

United States Patent Office 3,457,378
Patented July 22, 1969

3,457,378
MULTISPEED ENCODER

Peter J. Waznys, Richmond Hill, N.Y., and John A. Garrido, Englishtown, N.J., assignors to Collectron Corporation, New York, N.Y., a corporation of New York Filed Aug. 14, 1967, Ser. No. 660,252
Int. Cl. H01h 19/56, 21/76
U.S. Cl. 200—8 1 Claim

ABSTRACT OF THE DISCLOSURE

A multispeed digital encoder employing a plurality of code patterns, one code pattern of which moves at a submultiple of rotation with respect to another, and including improved means facilitating assembly, adjustment of brushes and mechanical durability.

This invention relates generally to the field of drum type digital encoders, and more particularly to an improved multispeed type of high accuracy, and employing an improved code pattern of the type disclosed in the copending application of John L. Mueller, Ser. No. 650,881, filed July 3, 1967, and assigned to the same assignee as the present application.

It is among the principal objects of the present invention to provide, in a digital encoder of the class described an improved means for positioning and anchoring the code carrying rotors with respect to a driven shaft, whereby assembly of the device is facilitated.

Another object of the invention lies in the provision, in a device of the above described class of improved brush holder means having precision adjustment means.

Yet another object of the invention lies in the provision of an improved construction of the type described which includes means for effectively covering and sealing the code patterns and cooperating brushes from contamination in the environs of their installed locations.

These objects and features, as well as other incidental ends and advantages, will more fully appear in the progress of the following disclosure, and be pointed out in the appended claim.

In the drawings, to which reference will be made in the specification, similar reference characters have been employed to designate corresponding parts throughout the several views.

FIGURE 1 is a central longitudinal sectional view of an embodiment of the invention.

FIGURE 2 is an end elevational view thereof, as seen from the right hand portion of FIGURE 1.

FIGURE 11 is a view in elevation of one of the rings forming part of the code pattern comprising a part of the embodiment.

Figure 3:
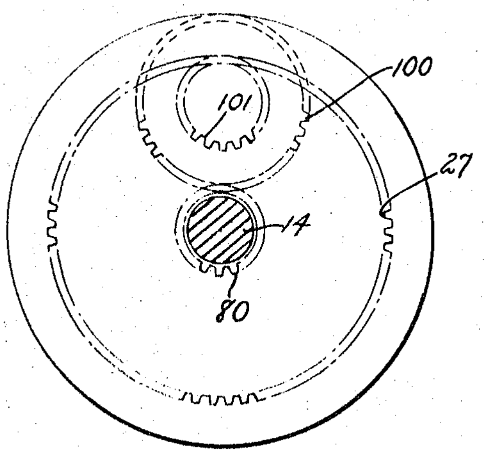
FIGURE 3 is a transverse sectional view of a housing component, as seen from the plane 3—3 in FIGURE 1.
Figure 4:
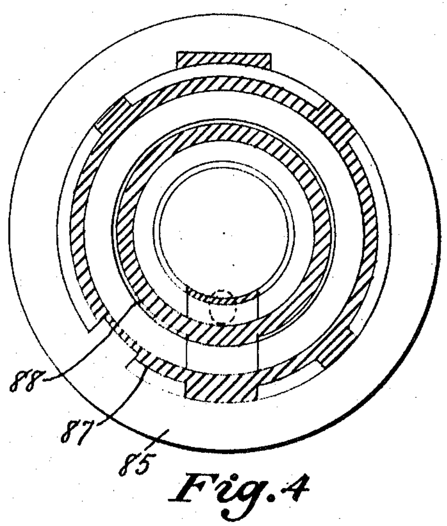
FIGURE 4 is a transverse sectional view as seen from the plane 4—4 in FIGURE 1.

In accordance with the invention, the device, generally indicated by reference character 10 comprises broadly: a housing element 11, a housing cover element 12, a plurality of individual brush holder elements 13, a driven shaft 14, a first or directly driven drum element 15 and second or geared drum element 16.

The housing element 11 may be formed by precision casting or machining, and includes an end wall member 21 including alignment means 22 for mounting the same as well as a retaining groove for the same purpose. The wall member 21 includes a central opening or bore 24 which mounts a bearing 25 supporting the shaft element 14.

Surrounding the bearing 25 is an annular recess 26, the side walls of which includes an internal ring gear 27 which forms part of the motion transmitting for driving the geared drum element 16. This recess communicates with a larger recess 28 which accommodates both the drum element 15 and the drum element 16.

The recess 28 is formed by a cylindrically shaped sleeve 19 bounded by first and second flanges 30 and 31, respectively as well as a recessed surface 32 having a plurality of parallel grooves 33 which form means for adjustably mounting brush holder elements 13, as will more fully appear hereinafter. Closing the chamber 28 is an end wall member 34 having a centrally disposed opening or bore 35 mounting a bearing 36 which supports an end of the shaft element 14.

The member 34 is maintained in position by screw means 37 which threadedly engage the flange 31. An outer surface 38 includes a recess 39 for a grounding terminal 39*a* (see FIGURE 2).

The housing or cover element 12 may be formed as a drawing operation and includes an end wall 40 defining an aligned opening 41 as well as a cylindrical wall member 42 which overlies the recessed surface 32. Screw retaining means 43 (FIGURE 2) retain the cover in position. An opening 45 permits passage of the ground conductor 46 connected at its inner end to the terminal 39*a*.

The brush holder elements 13 are all generally similar, and accordingly, a detailed description of one of said elements will serve equally well to describe all. Referring to FIGURES 6 to 10 in the drawings, inclusive, each element 13 includes a main body member 49 bounded by a curved inner surface 50, planar outer surfaces 51 and 52, and including a slotted opening 53. An elongated recess 54 accommodates a brush wire holder of planar configuration to which the individual brush wires 56 are soldered or otherwise electrically interconnected on one surface 57 thereof. A conductor 58 is suitably attached to the opposite surface thereof, and after positioning within the recess 54, a cover 60 is force fitted into the recess to seal the interconnection.

Figure 5:
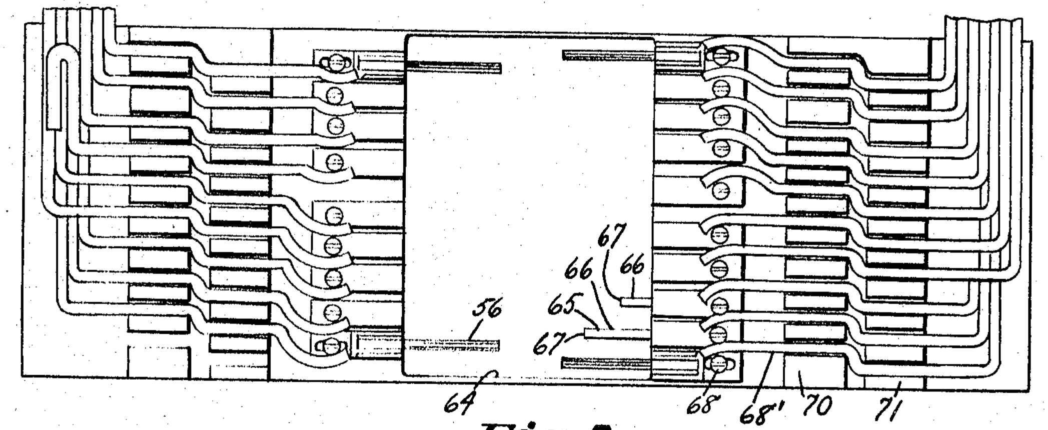
FIGURE 5 is a developed view of the outer surface of a housing showing the location of certain brush holding elements and associated strain relief means.
Figure 7:
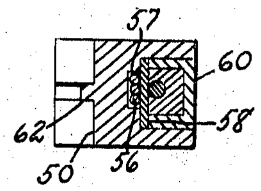
FIGURE 7 is a sectional view, partly in elevation as seen from the plane 7—7 in FIGURE 6.
Figure 6:
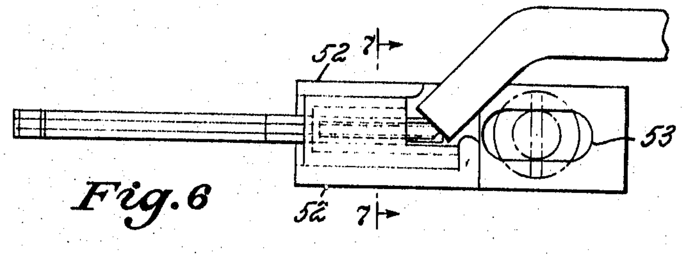
FIGURE 6 is a plan view of an individual brush holder element forming a part of the disclosed embodiment.
Figure 10:
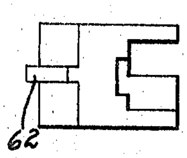
FIGURE 10 is an end elevational view as seen from the right hand portion of FIGURE 9.
Figure 9:
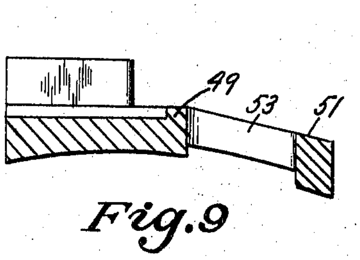
FIGURE 9 is a longitudinal central sectional view as seen from the plane 9—9 in FIGURE 8.
Figure 8:
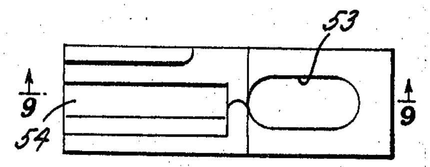
FIGURE 8 is a view in elevation corresponding to that seen in FIGURE 6, with certain of the component parts removed for purposes of clarity.

The surface 50 is provided with a longitudinally arranged elongated projection or tongue 62 selectively engageable with any of the groves 33. As seen in FIGURE 5 in the drawings, the housing element 11 is provided with one or more generally rectangularly shaped openings 64 which overlie the code pattern 65 formed of conductive strips 66 each having terminals 67. A screw 68 penetrates the opening 53, and retains the brush holder in operative position, while permitting adjustment of the brush wire tip with respect to the terminal 67 of an individual strip 66 by sliding the brush holder with respect to the grooves 33. Once the proper adjustment has been made, the screw is tightened to maintain the same for continued operation. Following this adjustment, the conductor 68' is positioned within the interstices formed by a first set of projections 70 and a second set of projections 71 which are offset relative to the first set 70, whereby the conductor is forced into an S-bend thereby forming a strain relief.

The driven shaft element 14 is best seen in FIGURE 1 in the drawings, and includes a projecting hub 76 supported in the above mentioned bearings 25 and 36, as well as internal bearings 77 and 78. Disposed in an outer cylindrical surface is a conical recess 79 accommodating detent means to be subsequently described, as well as a gear 80 forming part of the driving means for the second drum element 16.

The first or directly driven drum element 15 includes a main body 83 surrounded by an insulative member 84, in turn supporting a plurality of code-bearing conductive rings 85 (see FIGURE 11). The rings 85 include keying means 86 for maintaining the same in proper rotational alignment, so as to be capable of maintaining a fixed adjustment with respect to the brush holder elements. Disposed upon an inner planar surface are a pair of commutator rings 87 and 88 which together with a pair of corresponding brushes 89 on the second drum element 16 provide means for electrical communication between the code patterns on each drum element.

The element 15 is fixed relative to the shaft 14 by setscrew means accessible from an outwardly disposed end surface thereof, so as not to interfere with the location of the rings 85. To accomplish this, there is provided a transverse recess 91 in which there is disposed a locking ball or sphere 92 maintained in position by a threaded wedging member 93 in a longitudinally positioned threaded bore 94.

The second or geared drum element 16 includes a corresponding main body member 95 and insulative member 96, and corresponding code-bearing rings 97. An eccentrically arranged shaft 98 is maintained in position by a retaining ring 99, and mounts a gear 100 meshing with the gear 80 as well as a gear 101 meshing with the internal ring gear 27. Axial alignment is accomplished by a spring retainer 102 which contacts the first drum element 15.

We wish it to be understood that we do not consider the invention limited to the precise details of structure shown and set forth in this specification, for obvious modifications will occur to those skilled in the art to which the invention pertains.

We claim:

1. In a digital encoder, a driven element having a plurality of digital code conductive surfaces on an outer surface thereof, a housing overlying said outer surface and having an opening therein, at least one brush holder mounted on said housing, and brush means supported by said brush holder and overlying said opening to project therethrough to contact at least one of said plurality of conductive surfaces; said housing having a plurality of parallel grooves on an outwardly disposed surface thereof, said brush holder having a correspondingly arranged projection extending therefrom and slidably positionable within said grooves to permit axial adjustment of said brush holder with respect to said opening, said brush holder having a slot therein at substantially right angles to the axis of said projection, and threaded means penetrating said slot and engaging a threaded bore in said housing to retain said brush holder in adjusted position.

References Cited

UNITED STATES PATENTS

| | | | |
|---|---|---|---|
| 1,913,617 | 6/1933 | Smith. | |
| 2,853,563 | 9/1958 | Bole et al. | 200—8 |
| 3,019,427 | 1/1962 | Spaulding et al. | |
| 2,756,293 | 7/1956 | Bitler. | |

ROBERT K. SCHAEFER, Primary Examiner

M. GINSBURG, Assistant Examiner